(12) United States Patent
Wang et al.

(10) Patent No.: US 9,460,181 B2
(45) Date of Patent: Oct. 4, 2016

(54) DISTRIBUTED COMPUTING SYSTEM WITH RESOURCE MANAGED DATABASE CLONING

(71) Applicant: ServiceNow, Inc., Santa Clara, CA (US)

(72) Inventors: Paul Wang, Bothell, WA (US); Xiaoyi Ye, Sammamish, WA (US); Xuejia Lu, Bellevue, WA (US); Sridhar Chandrashekar, Sammamish, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 14/993,726

(22) Filed: Jan. 12, 2016

(65) Prior Publication Data

US 2016/0217042 A1 Jul. 28, 2016

Related U.S. Application Data

(60) Provisional application No. 62/106,796, filed on Jan. 23, 2015.

(51) Int. Cl.
*G06F 17/30* (2006.01)
*G06F 11/14* (2006.01)

(52) U.S. Cl.
CPC ..... *G06F 17/30575* (2013.01); *G06F 11/1448* (2013.01); *G06F 11/1461* (2013.01); *G06F 17/30581* (2013.01); *G06F 2201/80* (2013.01)

(58) Field of Classification Search
CPC .................... G06F 17/30575; G06F 17/30581
USPC ........................................................ 707/640
See application file for complete search history.

(56) References Cited

U.S. PATENT DOCUMENTS

| | | |
|---|---|---|
| 5,684,984 A | 11/1997 | Jones et al. |
| 6,892,221 B2 | 5/2005 | Ricart et al. |
| 7,356,734 B2 | 4/2008 | Ricart et al. |
| 7,389,314 B2 | 6/2008 | Kulkarni et al. |

(Continued)

FOREIGN PATENT DOCUMENTS

WO 2014/130035 A1 8/2014

OTHER PUBLICATIONS

Veeam Modem Data Protection, Modern Data Protection, Built for Virtualization, Product Bulletin, #1 VM Backup, downloaded Jan. 6, 2016, from http://veeampdf.s3.amazonaws.com/datasheet/veeam_backup_7_editions_comparison_en.pdf, 3 pp.

(Continued)

*Primary Examiner* — Thu-Nguyet Le
(74) *Attorney, Agent, or Firm* — Young Basile Hanlon & MacFarlane, P.C.

(57) ABSTRACT

In a distributed computing system, cloning operations determine when each of multiple backup database instances most recently experienced an update. If a most recently updated backup database instance was updated within a prescribed time period of one or more other backup database instances, a source instance for cloning is deemed to be one of these database instances satisfying a prescribed proximity criteria relative to a designated database instance. If a difference in update times is greater than the prescribed time period for the two most recent backup database instances, the source instance for cloning is deemed to be the most recently updated backup database instance. The control center conducts cloning to a target instance using the selected backup database instance as a source instance.

20 Claims, 7 Drawing Sheets

(56) References Cited

U.S. PATENT DOCUMENTS

| | | |
|---|---|---|
| 7,395,258 B2 | 7/2008 | Altinel et al. |
| 7,549,037 B1 | 6/2009 | Kale et al. |
| 7,555,620 B1 | 6/2009 | Manley |
| 7,555,674 B1 | 6/2009 | Wang |
| 7,680,795 B2 | 3/2010 | Lashley et al. |
| 7,890,508 B2 | 2/2011 | Gerber et al. |
| 8,234,469 B2 | 7/2012 | Ranade |
| 8,407,518 B2 | 3/2013 | Nelson et al. |
| 8,583,600 B2 | 11/2013 | Hazlewood et al. |
| 8,600,937 B1 | 12/2013 | Ravan |
| 8,666,938 B1 | 3/2014 | Pancholy |
| 8,832,028 B2 | 9/2014 | Susairaj et al. |
| 2010/0257142 A1 | 10/2010 | Murphy et al. |
| 2011/0093436 A1* | 4/2011 | Zha .................. G06F 17/30592 707/639 |
| 2013/0233627 A1* | 9/2013 | Vidal .................. G01G 19/414 177/25.13 |
| 2014/0019414 A1 | 1/2014 | Abraham et al. |
| 2014/0082167 A1 | 3/2014 | Robinson et al. |
| 2014/0095452 A1 | 4/2014 | Lee et al. |
| 2014/0114921 A1 | 4/2014 | Klimetschek et al. |
| 2014/0143207 A1 | 5/2014 | Brewer et al. |

OTHER PUBLICATIONS

Cloning an Oracle Database Using Recovery Manager (RMAN) Backup, downloaded Jan. 6, 2016, from http:// docs.oracle.com/cd/E24628_01/em.121/e27046/cloning_database.htm#EMLCM93233, 3 pp.

* cited by examiner

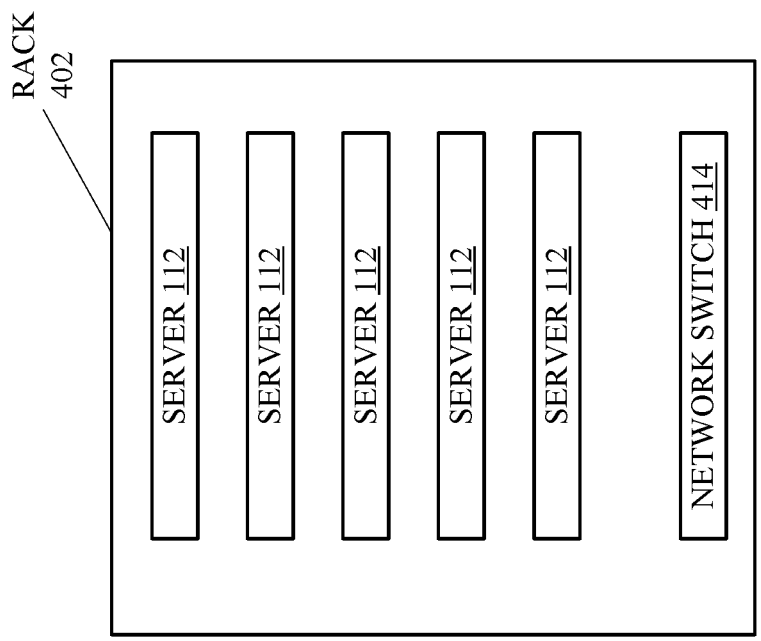
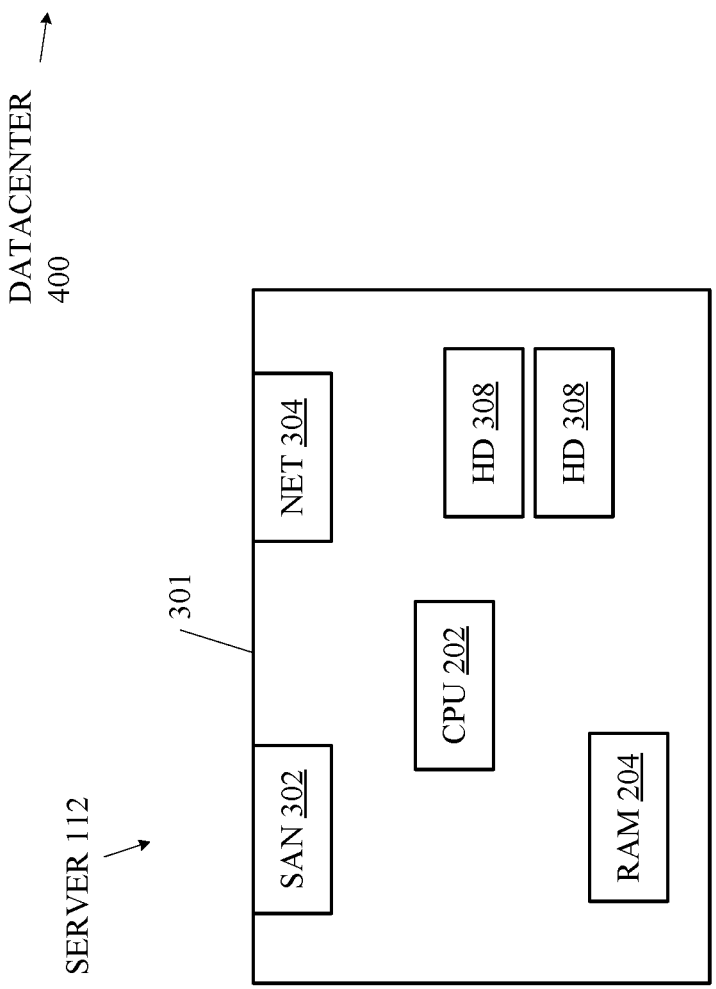
FIG. 4
FIG. 3

DISTRIBUTED COMPUTING SYSTEM WITH RESOURCE MANAGED DATABASE CLONING

CROSS REFERENCE TO RELATED APPLICATIONS

The present application claims the benefit of U.S. Provisional Application No. 62/106,796, filed Jan. 23, 2015, entitled, "Distributed Computing System with Resource Managed Database Cloning", herein incorporated by reference.

TECHNICAL FIELD

The present disclosure is generally related to information technology, and in particular a distributed computing system programmed to perform data cloning operations.

BACKGROUND

Modern computing systems often include large systems including multiple servers or processors communicating over local-area or wide-area networks serving multiple clients. These systems can store very large amounts of data and process many transactions in a given time period. Maintaining optimal system performance and the collection and analysis of transactional and dimensional data can be difficult or suboptimal in current systems.

SUMMARY

Disclosed herein are systems, methods, and apparatuses for conducting database cloning operations.

In an implementation, a computer-driven distributed data storage and management system for cloning database instances, comprises multiple datacenters comprising first and second datacenters, wherein each of the datacenters comprises a plurality of computerized servers and digital data storage, each of the servers comprises a digital data processor coupled to the digital data storage, the digital data storage of the first datacenter comprises a primary database, the digital data storage of the second datacenter comprises a standby database, the system further comprising backup database instances constructed by copying data from a corresponding data source comprising the primary or the standby database, and a control center coupled to the datacenters comprising a processor, a memory, a store and retrieve module, a cloning module, and other modules, wherein the modules comprise instructions stored in the control center memory that execute on the control center processor to execute operations, wherein the store and retrieve module directs the datacenters, including operation of the primary database to store and retrieve data on behalf of remote clients, and operation of the standby database to mirror the primary database for use upon a failover event, the cloning module, responsive to receiving or detecting a prescribed command, event trigger, or other occurrence identifies a plurality of the backup database instances and retrieves machine-readable records listing update times when each of the identified backup database instances most recently experienced an update from the backup database instance's data source, responsive to a first identified backup database instance having an update time within a prescribed period of a second identified backup database instance, where the first identified backup database instance is a most recently updated of the identified backup database instances, selects, as a source instance for cloning, the first or the second identified backup database instances satisfying a prescribed proximity criteria relative to a designated database instance, responsive to a difference in update times being greater than the prescribed period for two identified backup databases experiencing most recent updates, selects, as a source instance for cloning, one of the identified backup database instances whose update time is most recent, and clones the selected backup database instance to a target instance.

In an implementation, a computer-implemented method of conducting a database clone in a distributed computing system comprises a control center comprising a processor, coupled to multiple datacenters, each of the datacenters comprising a plurality of computerized servers, each of the computerized servers comprising a digital data processing machine coupled to digital data storage, wherein digital data storage of a first datacenter comprises a primary database operated on behalf of remote clients, and wherein digital data storage of a second datacenter comprises a standby database that mirrors the primary database for use upon a failover event, wherein the digital data storage also comprises a backup database constructed by copying data from the primary or standby databases, wherein the method comprises computer-implemented operations of receiving or detecting, by the control center, a prescribed command, event trigger, or other occurrence, responsive to the receiving or detecting, identifying, utilizing a processor of the control center, a plurality of the backup database instances and retrieving machine-readable records listing update times when each of the identified backup database instances most recently experienced an update from the backup database instance's data source, responsive to a first identified backup database instance having an update time within a prescribed period of a second identified backup database instance, where the first identified backup database instance is a most recently updated of the identified backup database instances, the control center selecting, utilizing its processor, a source instance for cloning one of the first and second identified backup database instances satisfying a prescribed proximity criteria relative to a designated database instance, responsive to a difference in update times being greater than the prescribed period for two identified backup databases experiencing most recent updates, the control center, utilizing its processor, selecting o as a source instance for cloning one of the identified backup database instances whose update time is most recent, and cloning the selected backup database instance to a target instance.

In an implementation, a control center apparatus for cloning database instances, comprises a processor and a memory coupled to the processor, a communications interface coupled to the processor and memory and comprising a port connected to a network and over which data is transferred to and from the network, a store and retrieve module stored in the memory and comprising instructions that, when executed on the processor directs operation of a primary database to store and retrieve data on behalf of remote clients, and operation of a standby database to mirror the primary database for use upon a failover event, a cloning module, that identifies a plurality of backup database instances and retrieves machine-readable records listing update times when each of the identified backup database instances most recently experienced an update from the backup database instance's data source, responsive to a first identified backup database instance having an update time within a prescribed period of a second identified backup database instance, where the first identified backup database instance is a most recently updated of the identified backup database instances, selects, as a source instance for cloning, the first or the second identified backup database instances satisfying a prescribed proximity criteria relative to a designated database instance, responsive to a difference in update times being greater than the prescribed period for two identified backup databases experiencing most recent updates, selects, as a source instance for cloning, one of the identified backup database instances whose update time is most recent, and clones the selected backup database instance to a target instance.

BRIEF DESCRIPTION OF THE DRAWINGS

The description herein makes reference to the accompanying drawings wherein like reference numerals refer to like parts throughout the several views, and wherein:

FIG. 3 is a block diagram of an example server.

FIG. 4 is a block diagram of an example datacenter.

DETAILED DESCRIPTION

Figure 1:
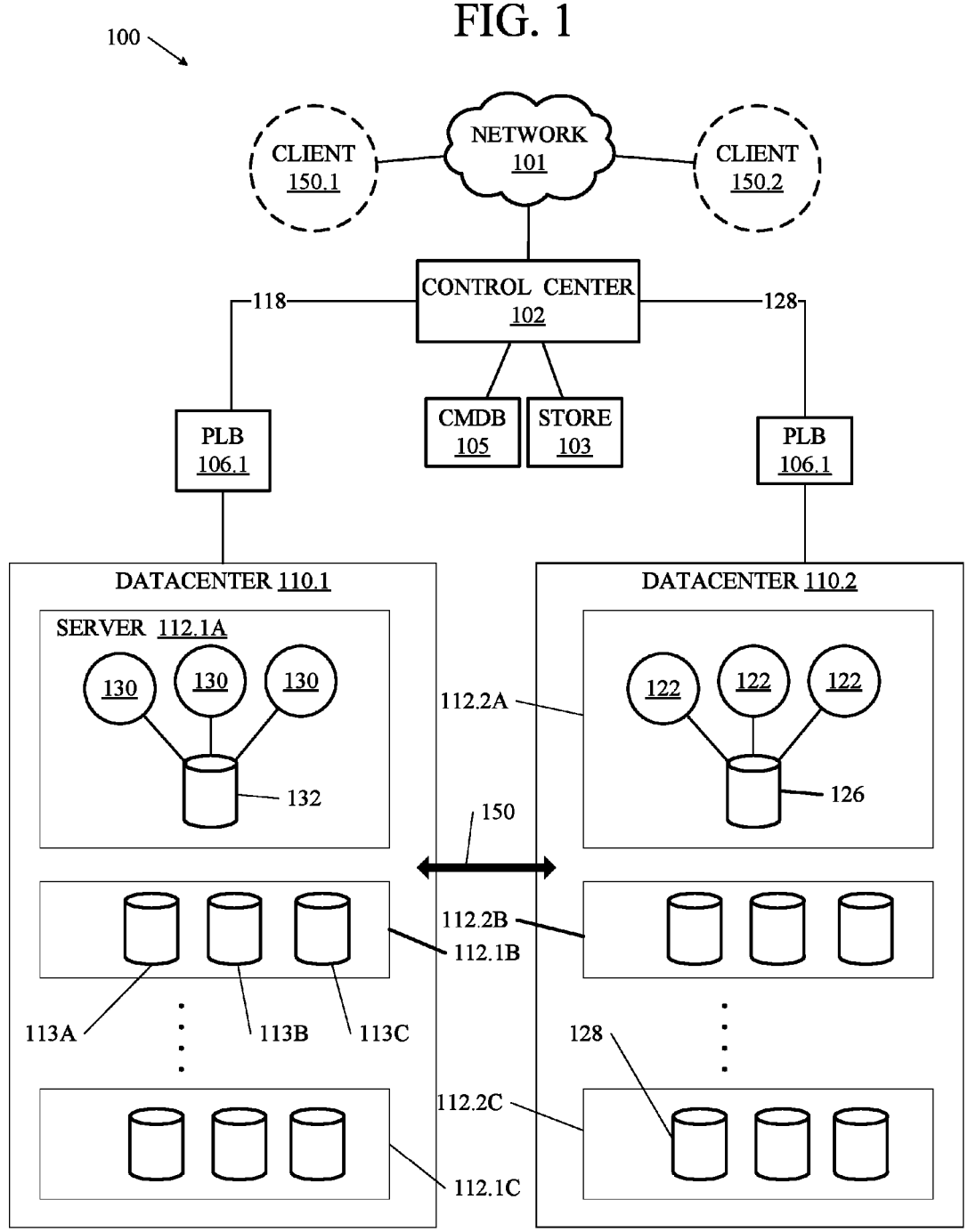
FIG. 1 is a block diagram of a distributed computing system.

The nature, objectives, and advantages of the present disclosure will become more apparent to those skilled in the art after considering the following detailed description in connection with the accompanying drawings.

Broadly, one implementation comprises a computer-driven distributed data storage and management system embodied by multiple datacenters. The datacenters store and provide a primary database for access by remote customers. A standby database mirrors the primary database, and is available to quickly perform a failover operation. The data embodied in the primary and standby databases may be referred to as a data source. The datacenters also store various backup databases that duplicate the data source for us in case of error, loss, disaster, file corruption, equipment failure, and the like.

In response to client input, the datacenter performs cloning operations. Cloning refers to replication of a data source, database management software, and other applications, nodes, or instances required to provide the data source as a database. This disclosure provides a cloning process that minimizes or eliminates impact to the data source, reduces data copy time from data source to target instance, and optimizes data freshness and data copy time.

Cloning is performed using a backup database corresponding to the primary and/or standby database. Before a cloning operation is carried out, one or more of the datacenters compare the freshness of the available backups. This comparison is configurable. For example, two backups may be considered to have the same freshness if they were last updated within a given time, such as one hour, of each other.

The clone target may reside in a different datacenter than clone source's datacenter. If two backups have the same freshness, then the datacenter of the source is selected so that data source is in the same datacenter as the target instance, or as physically proximate as possible. In addition to the cloning operation, this disclosure sets forth a variety of improvements implemented before and during cloning. Some example hardware components and interconnections of this digital data processing system and the related network are described as follows, and the functionality of these systems are separately discussed further below.

In one example, some or all of the features of this disclosure may be implemented in the context of cloud computing. Cloud computing can provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of four web server instances, four application server instances, and two database server instances. As previously described each of these server instances may be located on different physical servers and each of these server instances may share resources of the different physical servers with a number of other server instances associated with other customer instances. The web, application, and database servers of the customer instance can be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the standby database server. The cloud computing infrastructure can be configured to direct traffic to the primary pair of web servers which can be configured to utilize the primary pair of application servers and primary database server respectively. In a failure scenario, the secondary servers may be converted to primary servers. The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom UI elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

The proper allocation of computing resources of a physical server to an instance of a particular software server, such as a database server instance, can be important to the efficient and effective functioning of the cloud infrastructure. If too few resources are allocated, performance of the services provided to the customer using the database server may be degraded. If too many resources are allocated, computing resources may be wasted as the extra allocated resources may not meaningfully increase the performance of the services provided to the customer. Repeated over allocation of computing resources may require that additional server hardware be purchased to satisfy the over allocation, resulting in a greater than necessary cost for providing the cloud infrastructure. In current systems, the amount of possible RAM may be constrained per physical server and the utilization of RAM may be relatively higher than other available computing resources, such as processing cycles (e.g., CPU) and storage (e.g., solid state and magnetic hard disks). Thus, it may be advantageous to more precisely allocate the amount of RAM to each database server instance due to the relative scarcity of RAM resources. The techniques and devices described herein may relate to the allocation of cloud computing resources, one aspect of which is the allocation of RAM resources to database servers installed on a particular physical server machine. An initial allocation of RAM to a database server may be generated and the database server may be provisioned using the initial allocation. Periodic measurements can be taken of the database server tables and buffer sizes and ratios are calculated. Based on the ratios, a desired memory allocation can be determined, for example using a pre-determined lookup table of memory allocation sizes to the calculated ratios. The desired memory allocation can be compiled in a report. The report can include functionality to permit a user to initiate an automated action to re-provision the database server using the desired memory allocation. Alternatively, the re-provisioning of the database server can be initiated automatically without user interaction. One implementation of this disclosure concerns a distributed computing system.

FIG. 1 is a block diagram of an example distributed computing system 100. The system 100 includes a primary datacenter 110 and a secondary datacenter 120. A greater number of datacenters may be used, with two being shown for ease of explanation. The datacenters 110 are each coupled to a control center 102 by way of proxy load balancers 106. The control center 102 is linked to one or more clients 150.1, 150.2 (collectively or an example instance 150) via a telecommunications network 101. Broadly, the control center 102 directs operations of the datacenters 110.1, 110.2 on behalf of the clients 150. Some examples of these operations include hosting storage for the clients 150 and running applications for the clients 150. To that end, the control center may comprise a store and retrieve module and a cloning module, each containing algorithms that may be executed on a processor of the control center 102. In one implementation, the system 100 may constitute an embodiment of cloud computing, performed on behalf of the clients 150. In one example, the system 100 comprises a high availability system, where each data center 110 comprises a massively parallel execution engine.

The control center 102 comprises at least one digital data processing machine. This is exemplified by a server, workstation, desktop computer, notebook computer, mainframe computer, datacenter, or other hardware appropriate to carry out the functionality described herein. In one implementation, the control center 102 is coupled to or includes storage 103 containing a predefined list of machine-readable orchestrations. Each orchestration names, represents, signifies, embodies, lists, or incorporates a set of machine-executable actions that carry out the orchestration. In an embodiment where the orchestrations do not contain the corresponding machine-executable actions, then the storage 103 may additionally contain the actions associated with each orchestration. In contrast to the illustrated embodiment, the orchestrations may instead be provided in storage (not shown) outside of the control center 102 but nevertheless accessible by the control center 102. The storage 103 encompasses machine-readable storage devices and media of all types, as well as storage by virtue of being programmed into a circuitry such as an ASIC, FPGA, DSP, and such. Numerous examples of storage and logic circuits are explained in detail below.

The control center 102 is also coupled to or includes a configuration management database (CMDB) 105. The CMDB 105 comprises a database containing entries for the system's 100 information technology (IT) assets such as systems, software, facilities, products, network, storage, and the like. These assets, as represented in the CMDB 105, may be referred to as configuration items (CIs). Configuration item types may also include business types, such as organizations, people, markets, products, vendors, and partners. The CMDB 105 also describes the dependencies or other relationships among the configuration items. CMDBs are widely used, and many structural and operational details of the CMDB 105 will be apparent to those of ordinary skill in the relevant art, having the benefit of this disclosure.

As mentioned above, the control center 102 is linked to the clients 150 via the communications network 101. Although illustrated as a central hub for ease of illustration, the network 101 may be implemented by any form of communication link that supports data exchange between the control center 102 and the clients 150 in satisfaction of the functions and purposes expressed herein. In this regard, the network 101 may be configured as an overlay network, or a bus, mesh, tree, ring, star, peer-to-peer, overlay, or any combination or permutation of these or other known networks. The network 101 or one or more subcomponents thereof may include the public Internet or a corporate or government Intranet, for example. The network 101 may include one or more local area networks, wide area networks, Intranets, Extranets, Internetworks, Wi-Fi networks, or any other suitable technology using wires, radiofrequency, microwave, satellite, cellular, optical, or other telecommunications. As mentioned above, the control center 102 is linked to the datacenters 110 by proxy load balancers 106.1-106.2. Each load balancer may be configured to direct traffic to respective servers and processing nodes located within its datacenter. In regard to proxy services, in one example the proxy-load balancers 106 may be configured to provide a single Internet-delivered service to remote clients via the network 101, where this service is actually provided by a server farm composed of the computerized servers of the datacenters 110. The components 106 also coordinate requests from remote clients to the datacenters 110, simplifying client access by masking the internal configuration of the datacenters. The components 106 may serve these functions by directing clients to processing nodes as configured directly or via DNS. In regard to load balancing, the components 106 may be configured to direct traffic to the secondary datacenter in the event the primary datacenter 110 experiences one of many enumerated conditions predefined as failure.

Each of the datacenters 110 includes a plurality of computerized servers. In one example, each datacenter 110 may be provided by one or more physical racks of computing machines. More particularly, the datacenter 110.1 includes computerized servers 112.1A, 112.1B, and 112.1C, and the datacenter 110.2 includes computerized servers 112.2A, 112.2B, and 112.2C, although the number of servers may be increased or decreased in practice to suit the needs and context of the implementation. Each of the computerized servers comprises one or more digital processing machines. These may be exemplified by a server, workstation computer, or other hardware appropriate to carry out the functionality described herein, as described more fully below. The servers include client data storage as well as further storage containing machine-executable tasks. These stored instructions may be stored or programmed into the respective servers. For instance, the instructions may be contained in storage accessible by the computerized server, incorporated into circuitry of the computerized server, incorporated into code executable by the server, or other means.

As mentioned above, storage of the servers includes client data storage. An example of this is the primary database 132 in the datacenter 110.1, and the standby database 126 in the datacenter 110.2. The datacenters 110 operate in such a manner that the standby database 126 provides an exact or substantially exact mirror of the primary database 132.

Figure 8:
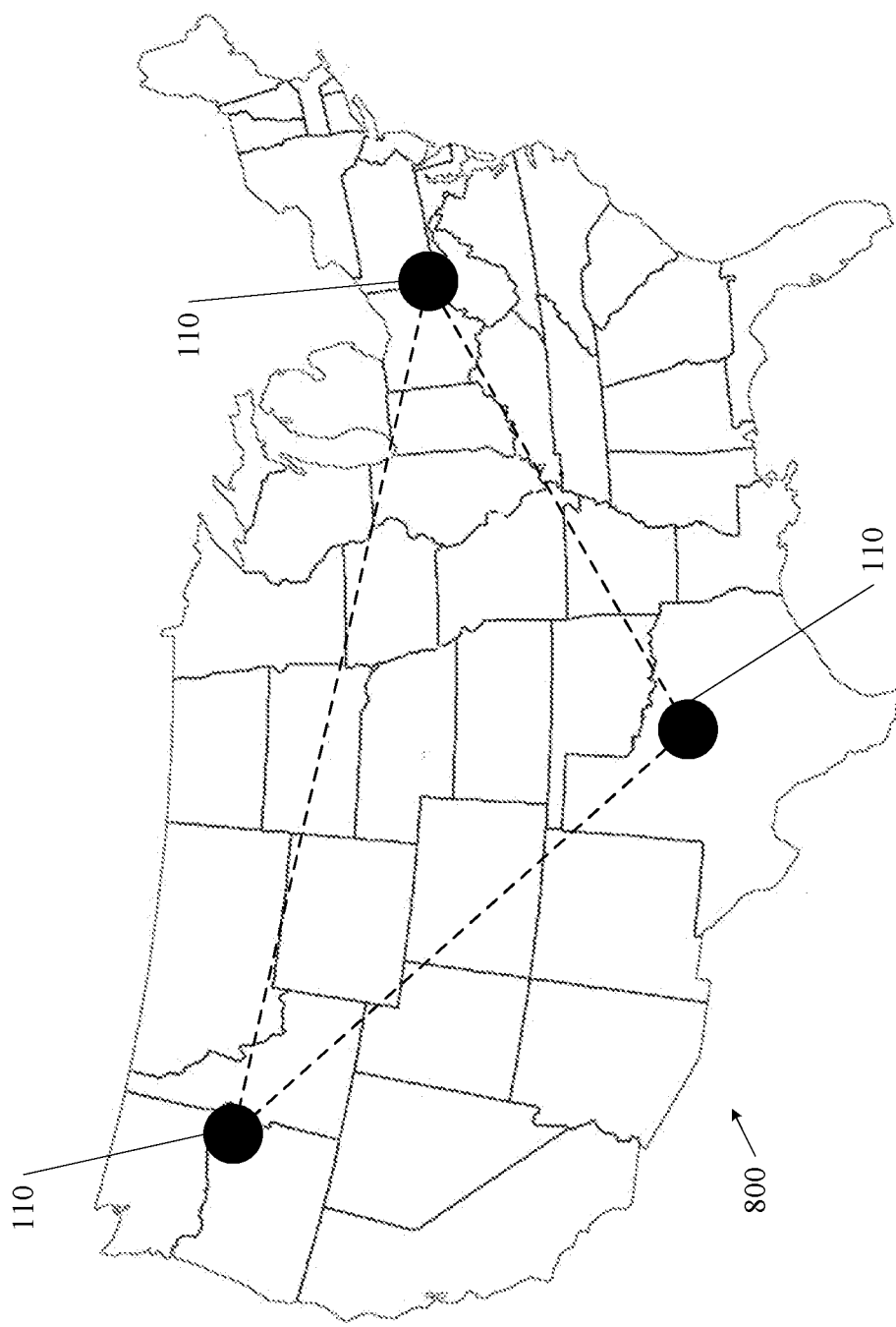
FIG. 8 is a map showing physical locations of datacenter hardware.

The data represented by the primary and standby databases 132, 126 may be referred to as a data source or source instance. In addition to cloning operations discussed herein, the datacenters 110 are programmed to conduct multiple backups of the data source. Some examples of these backups are illustrated at 113A-113C and 128. In practice, a greater or lesser number of backups may be implemented in practice, and some of these may reside in data centers that are provided in addition to the datacenters 110. Relatedly, the datacenters 110 and any further datacenters may be physically sited in geographically diverse locations. In this regard, FIG. 8 is a map showing physical locations of datacenter hardware. As illustrated, datacenters 810 are located in geographically distinct sites across the United States 800.

Each datacenter includes processing nodes such as 130 and 122, although a greater or lesser number may be implemented in practice. The nodes comprise processing threads, virtual machine instantiations, or other computing features of the datacenters that run programs on behalf of remotely sited clients, and exchange related data with such clients via the network 101. Some of the nodes may be dedicated to database management functions involving databases such as 132, 126.

Each processing node runs an application program or conducts a database function on behalf of one of the remote clients 150 and according to directions of the control center 102. In one implementation, each node 130, 122 comprises virtual machine instantiation performing certain machine-executable actions. Alternatively, a node may comprise an application. A node may have its own operating system, or not, depending upon the implementation.

The datacenters 110 include a messaging infrastructure, which may include one or more communications links, busses, backplanes, cables, wires, queues, buffers, networks, and/or other interconnection components. The messaging infrastructure is not shown, for ease of illustration of the other features of the system. The messaging infrastructure includes one or more interlinks such as 150 to support inter-datacenter communications.

To provide further illustration of the hardware of an example computerized server, FIG. 3 is a block diagram showing the hardware components of an example computerized server. The example computerized server 112 includes a storage enclosure 301 containing a storage area network (SAN) unit 302, networking hardware 304, CPU 202, and RAM 204. The computerized server 112 also includes one or more digital data storage devices which in this case are exemplified by hard disk drives 308.

To provide some further illustration of the hardware of an example datacenter, FIG. 4 is a block diagram showing the hardware components of an example datacenter. The example datacenter 400 includes a storage rack 402 containing various servers 112 and one or more network switches such as 414. The systems illustrated above include numerous components that may be implemented with data processing functionality. In any of these cases, such data processing features may be implemented by one or more instances of hardware, software, firmware, or a subcomponent or combination of the foregoing. Some example hardware of these subcomponents is described as follows.

Figure 2:
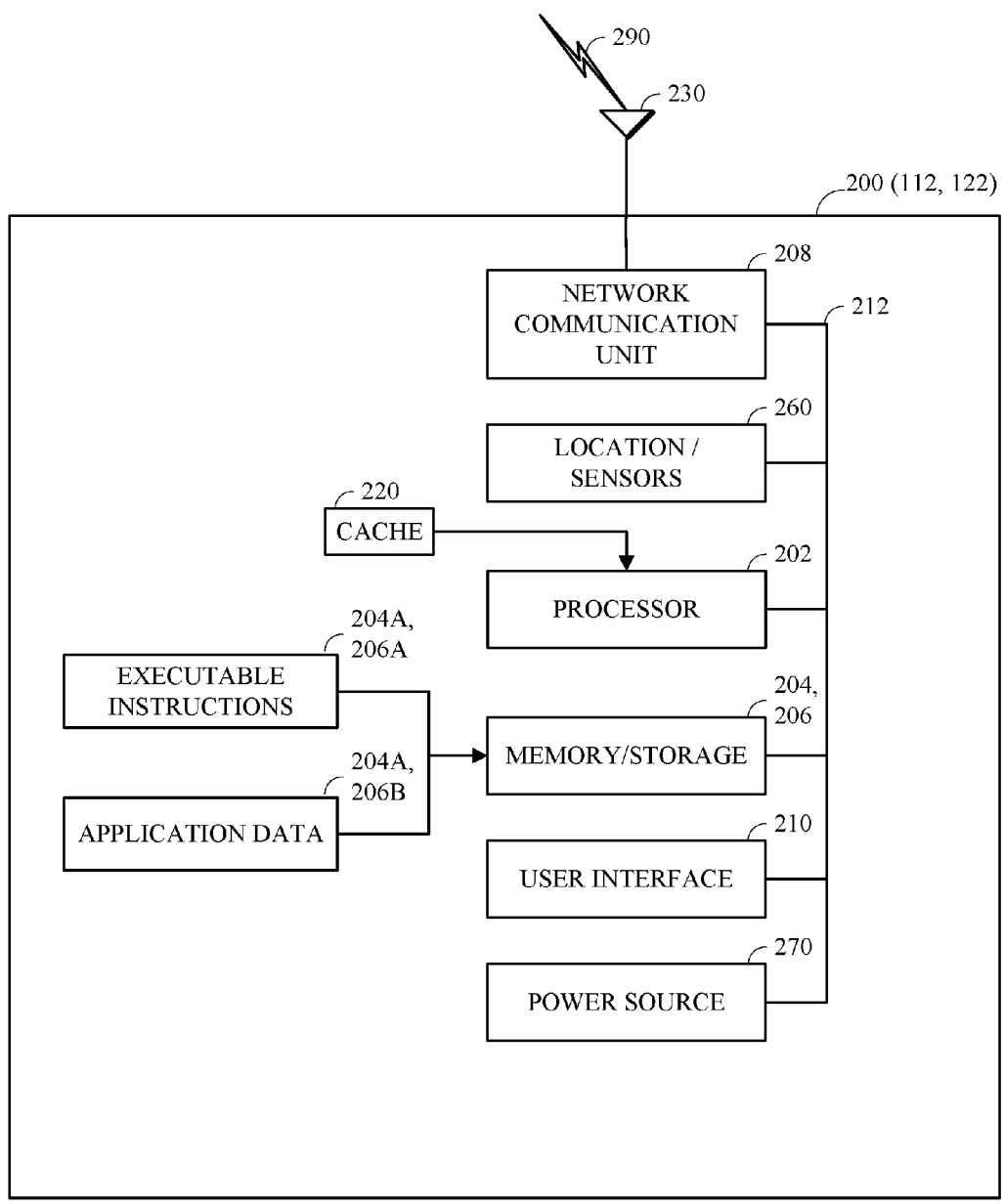
FIG. 2 is a block diagram of a digital data processing machine.

FIG. 2 is a block diagram of an example internal configuration of a computing device 200, such as a client 150 or server device 122 of the computing system 100 as shown in FIG. 1, including an infrastructure control server, of a computing system. As previously described, clients 150 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional aspects of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. A graphical user interface (GUI) 210 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

As used herein, "computer" may be used to refer to any of the digital data processing machines, devices, circuitry, instance, or embodiments discussed herein as well as those that will be apparent to those of ordinary skill in the relevant art having the benefit of this disclosure.

As mentioned above, the disclosed components include or utilize various instances of digital data storage. Depending upon its application, this digital data storage may be used for various functions, such as storing data and/or storing machine-readable instructions. These instructions may themselves aid in carrying out various processing functions, or they may serve to install a software program upon a computer, where such software program is thereafter executable to perform other functions related to this disclosure.

Figure 5:
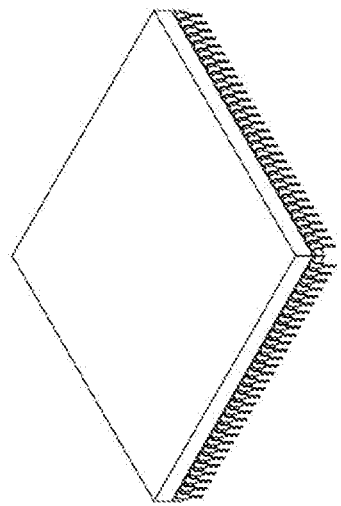
FIG. 5 is a perspective view of example digital data storage.

In any case, the storage media may be implemented to digitally store machine-readable signals. One example is optical storage such as CD-ROM, WORM, DVD, digital optical tape, optical disk storage 500 (FIG. 5), or other optical storage. Another example is direct access storage, such as a "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An example storage medium is coupled to a processor so the processor may read information from, and write information to, the storage medium. In the alternative, the storage medium may be integral to the processor. In another example, the processor and the storage medium may reside in an ASIC or other integrated circuit.

Figure 6:
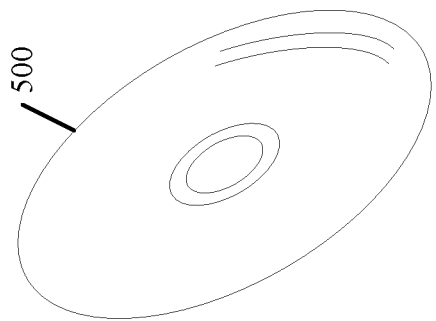
FIG. 6 is a perspective view of an example logic circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 6 shows an example logic circuit 600.

Figure 7:
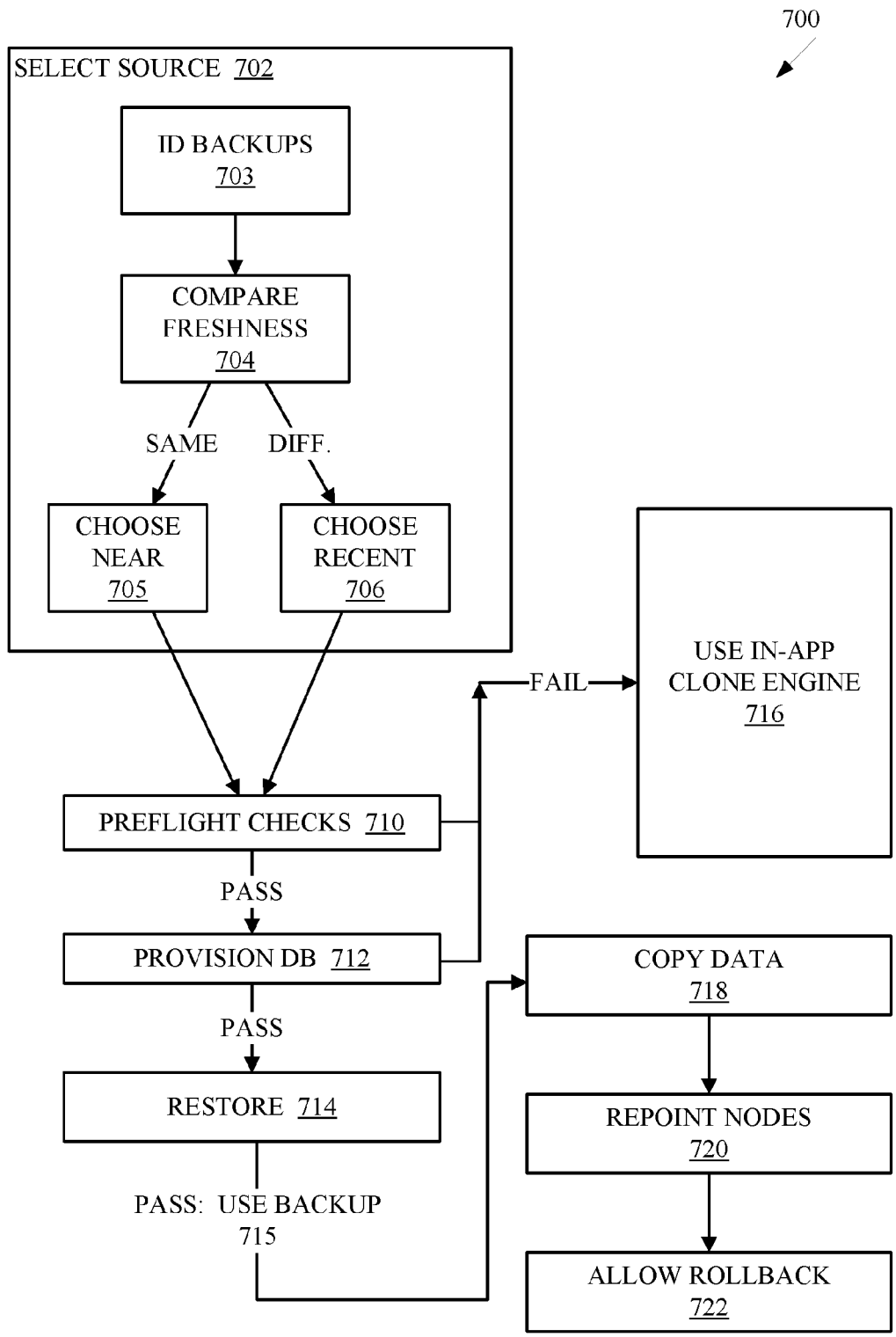
FIG. 7 is a flow chart of example operations performed by a distributed computing system.

Having described the hardware components and interconnections of the disclosed system, the operation of these components is now discussed. In this regard, FIG. 7 shows some example operations performed by a distributed computing system. The operations of any method, process, or algorithm described in connection with the embodiments disclosed herein may be embodied directly in hardware, firmware, software executed by hardware, circuitry, or a combination of these.

Without any intended limitation, in the illustrated implementation the operations 700 are performed by the control center 102. The operations 700 concern preparation for, and execution of, a database cloning operation. In the illustrated example, the operations 700 are initiated in response to a command submitted by one of the clients 150. In a different case (not shown), the operations 700 may be initiated by the control center 102 or one of the datacenters 110 in accordance with housekeeping, database maintenance, regular or irregularly schedule or spontaneous events, or other automated tasks performed in the distributed computing system 100. The operations 700, thus, may be initiated in response to receiving or detecting a prescribed command, event trigger, or any other occurrence.

The client command, event trigger, or other causality that initiates data cloning specifies a data source to use in the cloning operation. In the illustrated example, the data source comprises the data represented by the primary database 132 and its mirrored copy at the standby database 126. The command also identifies a target storage site or instance, such as one of the servers of the datacenters 110, or a more particular storage site such as a storage device, storage address, or other site designation.

Since the primary database must be on-line and available to carry out client data functions, and the secondary database requires full availability in case of a failover operation, use of the primary and secondary databases 132, 126 themselves for cloning operations is avoided if possible, and instead, the control center 102 will perform cloning using one of the backup database instances such as 113A-113C, 114, 128, etc.

Accordingly, in operation 702 the control center 102 must select the particular backup database instance to be used as a source for the cloning operation. Operation 703 identifies the various available backup database instances whose data corresponds to the primary and secondary databases. This may be carried out, in one implementation, by the control center consulting the CMDB 105. Operation 704 compares the freshness of the various backup database instances, and namely, how recently they have been updated. In one implementation, the freshness of a backup database is indicated by the time that the most recent full or differential backup was performed to that database. To this end, operation 704 retrieves machine-readable records listing update times when the multiple backup database instances experienced updates from their data source. In one implementation, the backup times are listed in the CMDB 105. Operation 704 compares the differences in update times among the backup databases. If the most recently updated backup database instance was updated within a prescribed time period of one or more other backup database instance, then operation 704 treats these backup databases as having an equivalent update time. For example, if the most recent backup database instance was updated at 12:00 p.m. and subsequent backups occurred at 12:10 p.m. and 12:30 p.m., these will be treated as having equivalent freshness if the prescribed time period is set to one hour. In one implementation, the control center 102 is programmed to accept user selection, modification, or pre-configuration of the prescribed time period. One feature, then, is that the user may choose the time criteria for deeming backup databases to have the same freshness. If operation 704 answers "same," then operation 704 proceeds to operation 705.

From among the backup database instances having equivalent update times or "freshness," operation 705 selects the backup database instance that is the most proximate to a designated database instance. In one example, the designated database instance may comprise a testing instance such as instance 912, discussed below. In another example, the designated database instance may comprise the target site identified in the client command, event trigger, or other causality that initiated data cloning as discussed above.

Proximity may comprise a physical proximity such as distance or geography, or a logical proximity such as residence within the same datacenter or server or other machine or virtual device or logical construct. A combination of physical and logical criteria may be used. One example of proximity is expressing a preference to select a backup database instance from the same datacenter as the designated database instance, rather than a datacenter located across the country. In one implementation, this operation 705 operates according to proximity criteria pre-programmed into the control center. However, the control center 102 may be programmed to accept user selection, modification, or pre-configuration of the proximity criteria. One feature, then, is that the user may choose specify the level of preferred nearness of a selected backup database to the designated database instance.

In contrast to the foregoing, if the most recently updated backup database is significantly more fresh than the other available backup databases, then operation 706 chooses this backup database for the cloning operation, regardless of physical proximity to the designated database instance. Significantly more fresh means having an update time that is earlier by the prescribed time period or more.

The operations subsequent to 705-706 initiate cloning to the target storage site using the selected backup database instance as a "source" for the cloning. In this sense, the selected backup database instance is considered a source instance for the target instance. After operations 705-706, and prior to the operations where data is actually copied, operations 710-714 perform some preliminary operations. Operation 710 performs various so-called preflight checks. One example is verifying that the backup database instance, selected in 705 or 706, actually exists. In one implementation, if selected the backup instance is more than a given age, such as twenty-four hours, then the backup instance cannot be used and the preflight check 710 fails. Another example of the preflight checks of operation 710 comprises validating the backup database instance in the CMDB 105. If the cloning operation is being performed to replace an earlier database, then this data may also be verified in the CMDB 105. This operation ensures that the CMDB 105 contains correct data for the clone source (backup data instance) and clone target (database being replaced) and data is not missing. Another example of the preflight checks of operation 710 includes verifying that the selected backup database instance is not stale with respect to its data source. If the primary database 132 was updated after the selected backup database instance, then the backup database instance is stale and operation 710 fails. One example of this is where the source schema has changed, which indicates that the backup data might not be able to be restored properly. Another example of the preflight checks of operation 710 includes determining whether automation can read the source and target version. If any of the preflight checks fail, then operation 710 proceeds to operation 716, which is described below.

Figure 9:
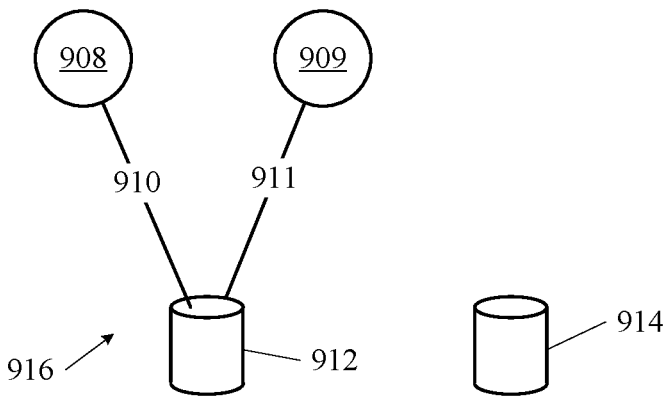
FIGS. 9-11 are block diagrams of an example cloning sub operations.
Figure 10:
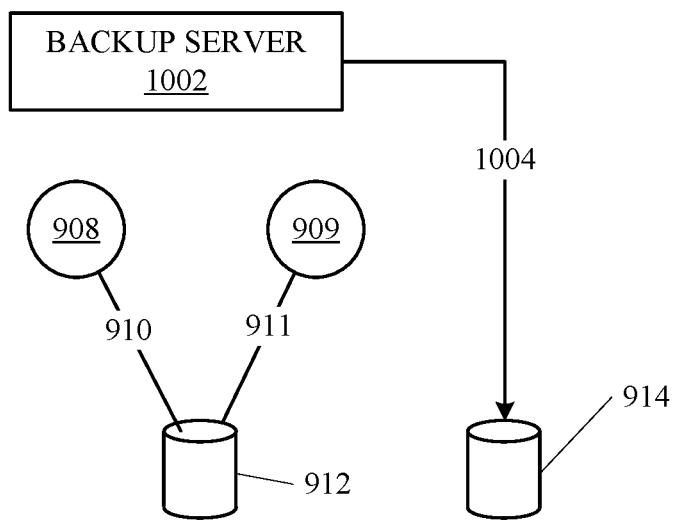
Figure 11:
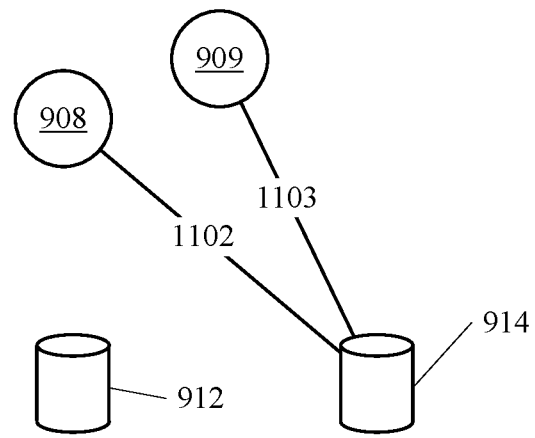

If the preflight checks 710 pass, then operation 712 provisions the target database instance. This involves appropriating storage hardware and other operations to ready the ultimate target database instance for access by clients 150. This is explained with reference to FIGS. 9-11, which are block diagrams of some example cloning sub operations. In the currently illustrated example, the system includes various testing instances, which are clones made from backups of the primary or secondary databases 132, 126. Each testing instance is a non-production instance available for the associated client 150 to experiment with different changes in configuration, software, data structures, and the like. FIG. 9 illustrates a testing instance 916 comprised of nodes 908, 909 and data 916. This provides one example context for conducting cloning, and namely, the purpose of cloning of a backup database (such as 113A-113C or 128) to provide a more current testing instance for use by the associated one of the clients 150.

FIG. 9 illustrates the newly provisioned database at 914. In one implementation, the newly provisioned database 914 has the same size capacity as the testing instance 912. This reduces clone downtime and allows the customer to optionally roll back quickly after the clone is completed, as discussed below. In one implementation, operation 712 first attempts to provision to the same server as the testing instance 912, but if there is insufficient capacity, operation 712 attempts to complete the provisioning in the same datacenter as the testing instance. Provisioning a new database can fail due to capacity or other issues. In this case, operation 712 fails, and the operations proceed to operation 716, which is described below.

If operation 712 passes, however, operations proceed to operation 714, which conduct a restore operation from the selected backup database instance. Broadly, the restore operation 714 includes unzipping the selected backup database instance and checking or verifying the backup data, metadata, and structure. In one implementation, the restore operation may be conducted using a program such as PERCONA XTRABACKUP, which is an open source hot backup utility for MySQL. Excluded tables may be filtered out as predefined by the system or specified by customer input. If the restore operation 714 fails, operation 716 is performed as described below. As mentioned above, if any of operations 710-714 fail, then the selected backup database cannot be safely used as a source for the cloning operation. In this event, cloning is conducted using an in-application cloning engine, as indicated by operation 716. The in-application cloning engine uses a node such as 130 or 122 to perform the requested clone directly from the primary 132 or standby 126 database, during which time the data remains available to the client. The in-application cloning operation may be referred to as a fallback operation. By using in-application cloning only as a fallback feature, this avoids using in-application engines to conduct clones unless this is necessary, thereby conserving processing and storage resources associated with the primary and secondary databases 132, 126. More particularly, this reduces resource usage on the data source, thereby reducing impact to other customer instances deployed to the same physical machine. This also reduces the amount of time required for the clone operation and the clone process workflow. Fallback reduces the duration of the impact to the end customer, among other benefits.

In contrast to operation 716, if all of the operations 710-714 pass, then cloning will be performed using the selected backup database instance as planned, as shown by operation 715. Operation 718 begins the copying of data. In one implementation, this is performed by applying a data synchronization tool such as RSYNC to the target database instance that was provisioned in operation 712, and importing preserved data. To further illustrate this operation, reference is made to FIG. 10, which depicts a backup server 1002 copying data to the newly provisioned database 914 via a link 1004.

After operation 718, operation 720 performs a node repoint and version mismatch. Namely, operation 720 severs or moves the links 910, 911 (FIG. 10) from application nodes 908, 909, so that new links 1102, 1103 (FIG. 11) link the nodes 908, 909 to the newly provisioned database 914, now populated with data from the backup server 1002 as explained above. If the testing instance 912 and the target instance 914 have different versions, operation 720 downloads and installs the version at the nodes 908, 909. Operation 720 also updates the target nodes' configuration file to use in the new database. Operation 720 further restarts the nodes 908, 909 to bring the target instance 914 online.

Operation 722 is provided to show that, even after repointing the nodes in operation 720, the process 700 allows roll back for a given time. In one implementation, the testing instance 912 will be retired after twenty-four hours. Optionally, the system may be configured such that this time period is client-configurable. Before the testing instance 912 is retired, the clone 914 is subject to being rolled back by repointing the target nodes 908, 909 to the old database 912. After the given time, however, the old target database 912 is retired, and the cloning operation and process 700 are complete. Rollback may be initiated according to client request or a system event or condition.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The aspects herein may be described in terms of functional block components and various processing operations. Such functional blocks may be realized by any number of hardware and/or software components that perform the specified functions. For example, the described aspects may employ various integrated circuit components, e.g., memory elements, processing elements, logic elements, look-up tables, and the like, which may carry out a variety of functions under the control of one or more microprocessors or other control devices. Similarly, where the elements of the described aspects are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the aspects of the invention could employ any number of conventional techniques for electronics configuration, signal processing and/or control, data processing and the like. The words "mechanism" and "element" are used broadly and are not limited to mechanical or physical embodiments or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

Information, data, and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect, or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way.

All references, including publications, patent applications, and patents, cited herein are hereby incorporated by reference to the same extent as if each reference were individually and specifically indicated as incorporated by reference and were set forth in its entirety herein.

The above-described aspects have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A computer-driven distributed data storage and management system for cloning database instances, comprising:
    multiple datacenters comprising first and second datacenters;
    wherein:
        each of the datacenters comprises a plurality of computerized servers and digital data storage;
        each of the servers comprises a digital data processor coupled to the digital data storage;
        the digital data storage of the first datacenter comprises a primary database;
        the digital data storage of the second datacenter comprises a standby database;
    the system further comprising:
        backup database instances constructed by copying data from a corresponding data source comprising the primary or the standby database; and
        a control center coupled to the datacenters comprising a processor, a memory, a store and retrieve module, a cloning module, and other modules, wherein the modules comprise instructions stored in the control center memory that execute on the control center processor to execute operations;
    wherein:
    the store and retrieve module directs the datacenters, including operation of the primary database to store and retrieve data on behalf of remote clients, and operation of the standby database to mirror the primary database for use upon a failover event;
    the cloning module, responsive to receiving or detecting a prescribed command, event trigger, or other occurrence:
        identifies a plurality of the backup database instances and retrieves machine-readable records listing update times when each of the identified backup database instances most recently experienced an update from the backup database instance's data source;
        responsive to a first identified backup database instance having an update time within a prescribed period of a second identified backup database instance, where the first identified backup database instance is a most recently updated of the identified backup database instances, selects, as a source instance for cloning, the first or the second identified backup database instances satisfying a prescribed proximity criteria relative to a designated database instance;
        responsive to a difference in update times being greater than the prescribed period for two identified backup databases experiencing most recent updates, selects, as a source instance for cloning, one of the identified backup database instances whose update time is most recent; and
        clones the selected source instance to a target instance.

2. The system of claim 1, wherein the control center receives and implements user configuration of the prescribed period.

3. The system of claim 1, wherein the control center receives and implements user configuration of the prescribed proximity criteria.

4. The system of claim 3, wherein the proximity criteria comprises a physical proximity.

5. The system of claim 3, wherein the proximity criteria comprises a logical proximity.

6. The system of claim 1, wherein the prescribed proximity criteria favors backup database instances sharing a common datacenter as the designated data instance.

7. The system of claim 1, wherein:
    prior to the cloning operation, the control center conducts preparatory operations comprising conducting prescribed preflight checks, provisioning the target instance, and restoring from the selected backup instance to the provisioned target instance; and
    responsive to failure of any of the preparatory operations, instead of cloning the selected backup database instance, the control center performs the cloning operation using only processing nodes associated with the primary or secondary database to copy data directly from the primary or secondary database.

8. The system of claim 1, wherein:
    prior to the cloning operation, the control center conducts preparatory operations comprising conducting prescribed preflight checks, provisioning the target instance, and restoring from the selected backup instance to the provisioned target instance; and responsive to success of the preparatory operations, the control center conducts the cloning using only processing nodes unassociated with the primary and secondary databases.

9. The system of claim 7, wherein the prescribed preflight checks include verifying that the selected backup database instance exists.

10. The system of claim 7, wherein the preflight checks comprise validating the selected backup database and target instance in a configuration management database.

11. The system of claim 7, wherein the preflight checks comprise verifying that the selected backup database instance is capable of being successfully restored.

12. The system of claim 1, wherein the designated database instance comprises a previously created backup database instance to be replaced by the target instance.

13. The system of claim 1, wherein the designated database instance comprises a testing instance, and the testing instance is replaced with the target instance.

14. The system of claim 1, wherein the cloning comprises:
provisioning the target instance;
copying data from the selected backup instance to the provisioned target instance; and
re-pointing application nodes linked to a previously created backup database so that the application nodes link to the provisioned target instance.

15. The system of claim 14, wherein the control center is programmed to permit roll back of the target instance to the previously created database for a given time period after completing the cloning.

16. The system of claim 1, wherein the control center is programmed to perform a multiplicity of cloning operations to create a multiplicity of target instances.

17. A computer-implemented method of conducting a database clone in a distributed computing system comprising a control center comprising a processor, coupled to multiple datacenters, each of the datacenters comprising a plurality of computerized servers, each of the computerized servers comprising a digital data processing machine coupled to digital data storage, wherein digital data storage of a first datacenter comprises a primary database operated on behalf of remote clients, and wherein digital data storage of a second datacenter comprises a standby database that mirrors the primary database for use upon a failover event, wherein the digital data storage also comprises a backup database constructed by copying data from the primary or standby databases, wherein the method comprises computer-implemented operations of:
receiving or detecting, by the control center, a prescribed command, event trigger, or other occurrence;
responsive to the receiving or detecting, identifying, utilizing a processor of the control center, a plurality of the backup database instances and retrieving machine-readable records listing update times when each of the identified backup database instances most recently experienced an update from the backup database instance's data source;
responsive to a first identified backup database instance having an update time within a prescribed period of a second identified backup database instance, where the first identified backup database instance is a most recently updated of the identified backup database instances, the control center selecting, utilizing its processor, a source instance for cloning one of the first and second identified backup database instances satisfying a prescribed proximity criteria relative to a designated database instance;
responsive to a difference in update times being greater than the prescribed period for two identified backup databases experiencing most recent updates, the control center, utilizing its processor, selecting, as a source instance for cloning, one of the identified backup database instances whose update time is most recent; and
cloning the selected source instance to a target instance.

18. An apparatus comprising computer readable storage containing non-transitory storage of at least one machine-readable program to perform the operations of claim 17.

19. An apparatus comprising circuitry of multiple interconnected electrically conductive elements configured to perform the operations of claim 17.

20. A control center apparatus for cloning database instances, comprising:
a processor and a memory coupled to the processor;
a communications interface coupled to the processor and memory and comprising a port connected to a network and over which data is transferred to and from the network;
a store and retrieve module stored in the memory and comprising instructions that, when executed on the processor directs operation of a primary database to store and retrieve data on behalf of remote clients, and operation of a standby database to mirror the primary database for use upon a failover event;
a cloning module, that:
identifies a plurality of backup database instances and retrieves machine-readable records listing update times when each of the identified backup database instances most recently experienced an update from the backup database instance's data source;
responsive to a first identified backup database instance having an update time within a prescribed period of a second identified backup database instance, where the first identified backup database instance is a most recently updated of the identified backup database instances, selects, as a source instance for cloning, the first or the second identified backup database instances satisfying a prescribed proximity criteria relative to a designated database instance;
responsive to a difference in update times being greater than the prescribed period for two identified backup databases experiencing most recent updates, selects, as a source instance for cloning, one of the identified backup database instances whose update time is most recent; and
clones the selected source instance to a target instance.

* * * * *